(12) United States Patent
Park et al.

(10) Patent No.: US 11,367,349 B2
(45) Date of Patent: Jun. 21, 2022

(54) METHOD OF DETECTING SPEED USING DIFFERENCE OF DISTANCE BETWEEN OBJECT AND MONITORING CAMERA

(71) Applicant: KT&C CO., LTD, Seoul (KR)

(72) Inventors: Jong Bae Park, Seoul (KR); Hyun Mug Ji, Gyeonggi-do (KR); Young Ho Lim, Incheon (KR); Jung Pil Jung, Seoul (KR); Hyuk Sub Kwon, Seoul (KR)

(73) Assignee: KT&C CO., LTD, Seoul (KR)

( * ) Notice: Subject to any disclaimer, the term of this patent is extended or adjusted under 35 U.S.C. 154(b) by 158 days.

(21) Appl. No.: 16/875,409

(22) Filed: May 15, 2020

(65) Prior Publication Data
US 2020/0372794 A1 Nov. 26, 2020

(30) Foreign Application Priority Data
May 24, 2019 (KR) ........................ 10-2019-0061262

(51) Int. Cl.
*G08G 1/052* (2006.01)
*G08G 1/017* (2006.01)
(Continued)

(52) U.S. Cl.
CPC .............. *G08G 1/052* (2013.01); *G06V 10/22* (2022.01); *G06V 10/42* (2022.01); *G06V 20/54* (2022.01);
(Continued)

(58) Field of Classification Search
CPC .... G08G 1/052; G08G 1/017; G06K 9/00785; G06K 9/2054; G06K 9/52; G06K 2209/15; G06K 2209/23
See application file for complete search history.

(56) References Cited

U.S. PATENT DOCUMENTS

2013/0229517 A1 9/2013 Kozitsky et al.

FOREIGN PATENT DOCUMENTS

JP 2008-176472 A 7/2008
KR 10-0442422 B 7/2004
(Continued)

OTHER PUBLICATIONS

D. F. Llorca et al, Two-camera based accurate vehicle speed measurement using average speed atafixed point, 2016, IEEE 19th International Conference on Intelligent Transportation Systems (ITSC), pp. 2533-2538 (6 pages) (Year: 2016).*
(Continued)

*Primary Examiner* — David F Dunphy
(74) *Attorney, Agent, or Firm* — The Dobrusin Law Firm, P.C.; Terry M. Finerman

(57) ABSTRACT

Disclosed herein is a method of detecting a vehicle speed. The method includes receiving a first vehicle image photographed by a camera at a first time; identifying an area occupied by the license plate from the first vehicle image and extracting a first number; receiving a second vehicle image photographed by the camera at a second time; identifying an area occupied by the license plate from the second vehicle image and extracting a second number; comparing the first number with the second number to determine whether the first number is equal to the second number; deciding an actual size of the number of plate; calculating a distance between the vehicle and the camera at first and second times; and calculating a vehicle speed.

23 Claims, 5 Drawing Sheets

(51) Int. Cl.
*G06K 9/52* (2006.01)
*G06K 9/20* (2006.01)
*G06K 9/00* (2022.01)
*G06V 10/22* (2022.01)
*G06V 10/42* (2022.01)
*G06V 20/54* (2022.01)
*G06V 20/62* (2022.01)

(52) U.S. Cl.
CPC ............ *G08G 1/017* (2013.01); *G06V 20/625* (2022.01); *G06V 2201/08* (2022.01)

(56) References Cited

FOREIGN PATENT DOCUMENTS

| KR | 10-1291301 A | 7/2013 | | |
|---|---|---|---|---|
| KR | 10-2016-0100788 A | 8/2016 | | |
| KR | 10-2017-0088692 A | 8/2017 | | |
| RU | 2580332 C1 | 4/2016 | | |
| WO | 2016/125014 A1 | 8/2016 | | |
| WO | WO 2016/125014 | * 11/2016 | ............ | G08G 1/054 |

OTHER PUBLICATIONS

Garibotto, Speed-vision: speed measurement by license plate reading and tracking, 2001, Proceedings of ITSC01, IEEE Intelligent Transportation Systems (7 pages) (Year: 2001).*

Translation of Korean Final Office Action, KR Application No. 10-2019-0061262 dated Mar. 24, 2021.

Translation of Korean Notice to Grant Patent, KR Application No. 10-2019-0061262 dated May 21, 2021.

Translation of Korean Office Action, KR Application No. 10-2019-0061262 dated Sep. 25, 2020.

European Search Report, EP Application No. 19211900.6 dated May 8, 2020.

* cited by examiner

METHOD OF DETECTING SPEED USING DIFFERENCE OF DISTANCE BETWEEN OBJECT AND MONITORING CAMERA

CROSS REFERENCE TO RELATED APPLICATION

The present application claims priority to Korean Patent Application No. 10-2019-0061262, filed on May 24, 2019, the entire contents of which are incorporated herein for all purposes by this reference.

FIELD OF THE INVENTION

The present disclosure relates to a method of detecting a speed of a moving object using a speed measuring system. More particularly, the disclosure relates to a method of detecting a speed of a vehicle that is running on a road, using a vehicle-speed measuring system.

BACKGROUND OF THE INVENTION

Description of the Related Art

Unless otherwise indicated herein, contents described in this section are not the related art for the claims of this application, and the background art included in this section is not admitted as being the related art of the invention.

Generally, a vehicle-speed measuring system measures the overspeed of a vehicle when the vehicle is running on a road, thus allowing a driver to safely drive. The road in which the vehicle-speed measuring system may be installed may be an expressway, a national highway or the like.

When the overspeed of the vehicle is measured, the vehicle-speed measuring system detects a vehicle speed in a measuring device using several systems.

The speed is measured using a laser detector. Further, a loop detector has been long used in the field of vehicle-speed measurement, because it has high reliability and is lower in initial cost than other detectors.

However, in order to measure the speed using the laser detector or the loop detector, a process of laying the laser detector or the loop detector in the road is required, which causes citizen inconvenience due to traffic control during the laying process. Moreover, since a loop lead-in wire may be broken due to road works, the operation of the speed measuring device may be stopped.

In order to solve these drawbacks, attempts to use a piezo detector as well as the loop detector have been made. However, since an environment in which the piezo detector may be used is limited, the piezo detector is not popularized at present. Recently, the laser detector is applied to measure the vehicle speed. However, the laser detector is problematic in that its initial installation cost is excessively high, so that it is not extensively used any more.

In addition, other technologies for measuring the vehicle speed are known. For example, Korean Patent No. 10-1291301 entitled to "Vehicle-speed measuring system using image and radar" has been proposed.

In the technical field of measuring a vehicle speed, a basic system that measures the vehicle speed by recognizing a license plate of the vehicle has been already implemented, but the development of a speed measuring system requiring no separate detector is insufficient.

SUMMARY OF THE INVENTION

The present invention has been made in order to solve the above-mentioned problems in the prior art and an objective of the present disclosure is to provide a method of detecting a speed using a difference of a distance between an object and a monitoring camera. Particularly, the speed detecting method disclosed herein can be usefully employed as a vehicle-speed measuring method. Embodiments of the invention may provide a method and a device for measuring a vehicle speed, which make it more convenient to measure the vehicle speed, operate, and install equipment as compared to a conventional vehicle-speed measuring system. For example, the invention provides a vehicle-speed analyzing method that analyzes a vehicle speed by analyzing an image photographed with a time difference by a camera in a state where a separate detector is not installed, and a method of detecting a vehicle speed from an image that is photographed not by multiple cameras but by a single camera.

In order to achieve the object of the present invention, the invention provides a speed detecting method including: receiving a first vehicle image photographed by the camera at a first time t1; receiving a second vehicle image photographed by the camera at a second time t2; determining whether a vehicle of the first vehicle image and a vehicle of the second vehicle image are the same vehicle or not; identifying a standard of a license plate by analyzing a height, a width, and an interval of numbers in the license plate, or analyzing a width and a height of the license plate, and a position of an anchoring bolt of the license plate, from either of the first vehicle image or the second vehicle image, when it is determined that the vehicle of the first vehicle image and the vehicle of the second vehicle image are the same vehicle, and then deciding an actual size of the number of the plate from the identified license-plate standard; calculating a distance between the vehicle and the camera at the first time and the second time, using a focal length f of the camera, a pixel size s of the camera, and a size h of the number of the plate in the photographed vehicle image; and calculating the vehicle speed v using the distance between the vehicle and the camera at the first time and the second time, and a time difference between the first time and the second time.

According to the embodiments of the present disclosure, it is possible to provide the method of detecting the speed using the distance difference between the object and the monitoring camera. Particularly, the speed detecting method disclosed herein can be usefully employed as the vehicle-speed measuring method. The invention provides the method and device for measuring the vehicle speed, which make it more convenient to measure the vehicle speed, operate, and install the equipment as compared to the conventional vehicle-speed measuring system. For example, it is possible to analyze the vehicle speed on the basis of the photographed image without installing the separate detector, and to detect the vehicle speed from the image that is photographed not by multiple cameras but by a smaller number of cameras (e.g. single camera).

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
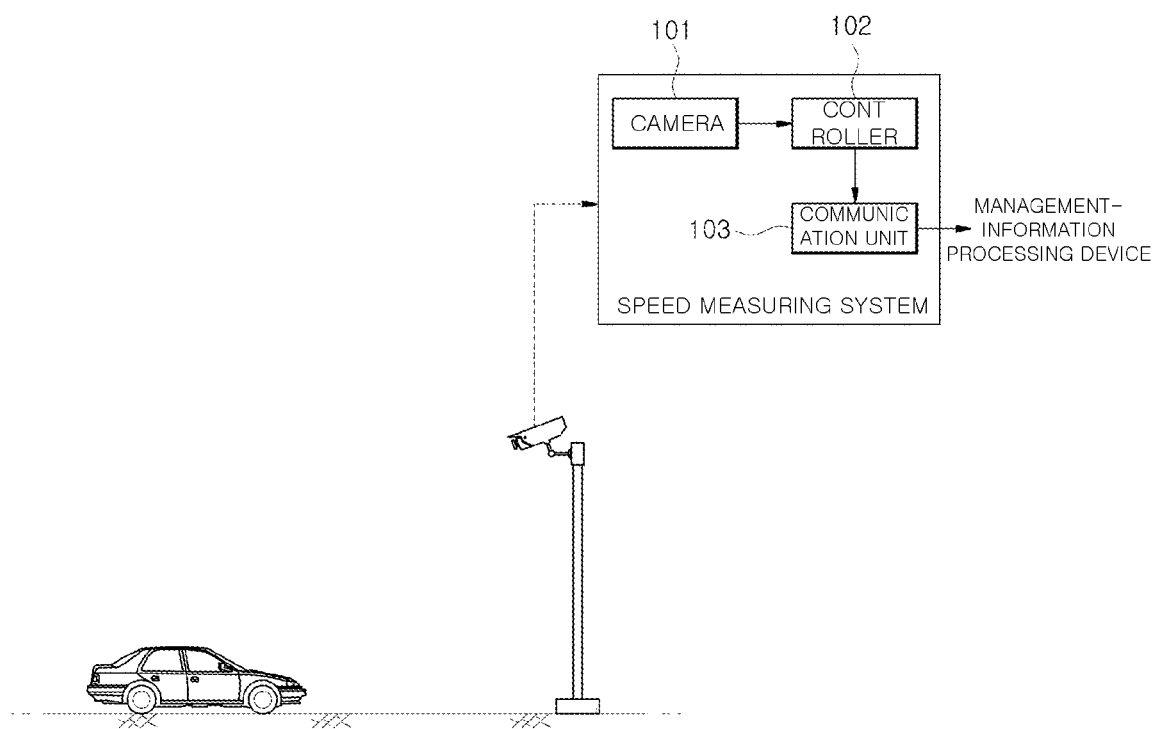
FIG. 1 is a diagram showing an entire vehicle-speed measuring system, according to an embodiment.

FIG. 1 is a diagram showing an entire vehicle-speed measuring system, according to an embodiment. As shown in FIG. 1, the vehicle-speed measuring system according to the embodiment includes a camera 101 that photographs a vehicle while it is driving, and a controller 102 that receives the photographed image to detect a vehicle speed. The vehicle-speed measuring system may further include a communication unit 103 that may transmit the detected vehicle speed, vehicle information and the like to a central server (management-information processing device).

In the embodiment, the camera 101 photographs and collects an image of a license plate of the vehicle with a predetermined time difference. According to the preferred embodiment, the camera that photographs the image with the predetermined time difference may be a single camera. That is, the license plate of the vehicle may be photographed at a first time and a second time by the same camera.

Figure 3:
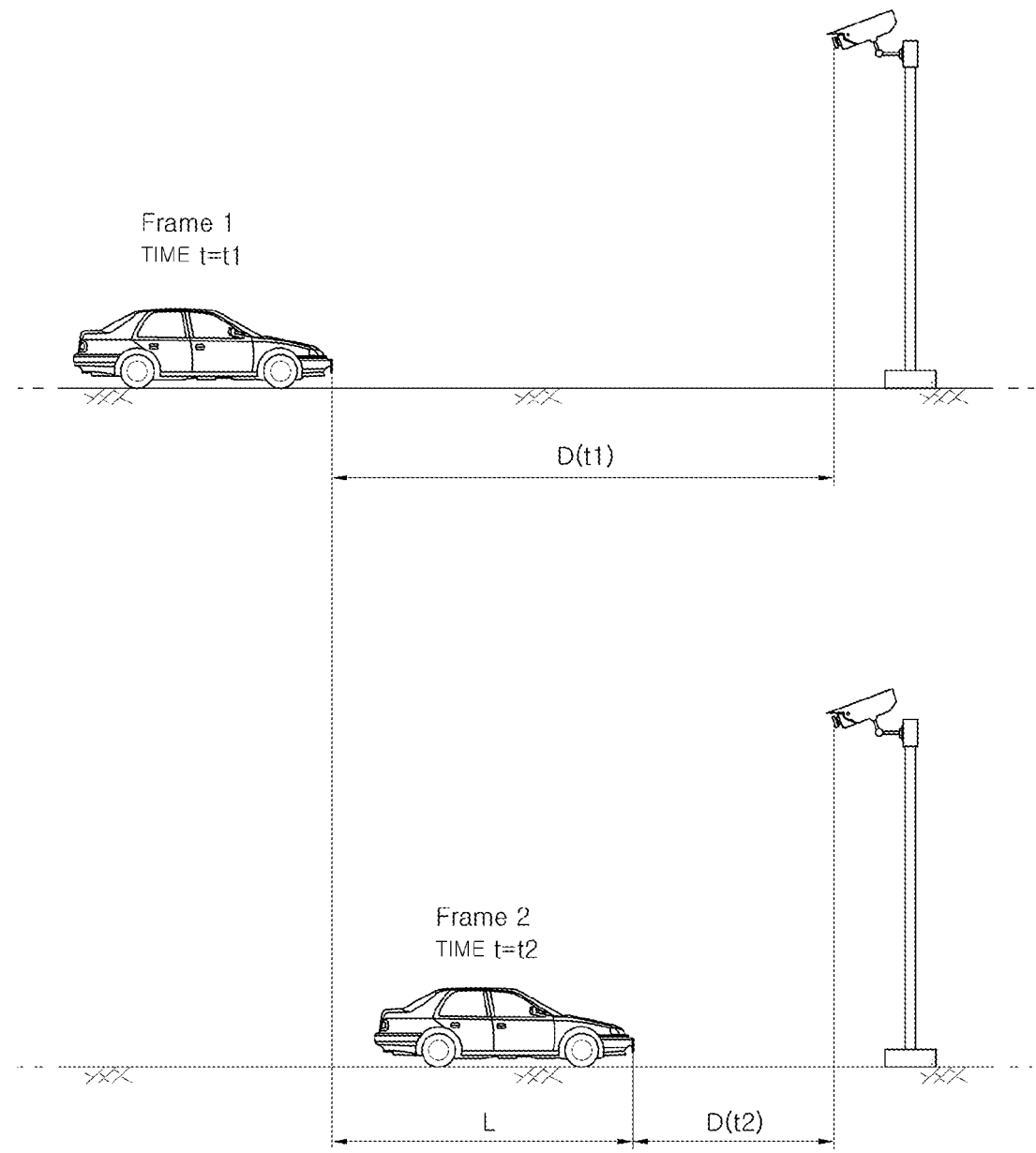
FIG. 3 is a diagram illustrating a method of detecting a speed using a difference of a distance between the vehicle and a monitoring camera, according to the embodiment.

The controller 102 may be referred to as other terms, such as a control unit, a processor, or a processing device, and functions to analyze a vehicle photographing image received from the camera and then detect a vehicle speed. The controller 102 may detect the vehicle speed by checking a distance difference between the vehicle and the camera on the basis of a series of images of the vehicle license plate photographed between times t1 and t2. In this case, the series of images are composed of at least two images. An operation of detecting the vehicle speed using the distance difference between the vehicle and the camera according to the above-described embodiment will be described later with reference to FIG. 3. In addition, the controller 102 may control the safe driving of the vehicle on the road by transmitting information about the speed of the vehicle that is driving on an expressway or the like through the communication unit 103 to the management-information processing device. In other words, the management-information processing device may be a kind of central server that receives collected information about the vehicle.

Next, the vehicle-speed measuring system according to the embodiment of FIG. 1 will be described in detail.

The vehicle-speed measuring system may calculate the distance difference between the vehicle and the camera between times t1 and t2 when the series of images are photographed, and the vehicle speed may be calculated according to the following equation. This is derived from the concept that the vehicle speed may be estimated through a size change in the license plate or the number described in the license plate in the image.

speed=distance difference(moving distance $L$ between $t1$ and $t2$)/time difference ($t2-t1$)

A position of the license plate in the camera image that is continuously photographed is changed as the vehicle moves.

If the vehicle comes closer to the camera, the size of the license plate or the number of the plate in the photographed image is increased. If the vehicle moves away from the camera, the size of the license plate or the number of the plate in the photographed image is decreased.

The size of the license plate, and the size of the number of the plate in the license plate may be determined by a standard, and different standards for the license plate may be applied depending on a vehicle model and a vehicle registration time. Each standard of the license plate specifies a predetermined license-plate size and plate-number size. The size of the license plate and the size of the number of the plate may be information that is preset according to the standard of the license plate. For example, in the case of US vehicles, all standards for the license plate are unified except for one or two states, unlike Korean license plates. Therefore, according to an embodiment, horizontal and vertical sizes (width and height) of the license plate, and the position of a bolt for attaching (anchoring) the license plate are standardized, so that information about the angle and the distance between the camera and the vehicle may be calculated using the size of the license plate and the position of the bolt.

According to another embodiment, types of the standard of the license plate may be specified by analyzing the distribution of numbers in the license plate by the image processing method. To be more specific, the standard of the license plate may be specified by analyzing the distribution of letters and numbers that form the license plate. If the standard of the license plate is specified, the actual size of the license plate and the actual size of the numbers in the license plate according to the standard of the license plate may be specified.

If a focal length f and a pixel size s (of a camera image sensor) among internal coefficients of the camera are known, the size of the license plate or the number of the plate in the image may be detected on the basis of a pixel size (pixel number) by the image processing method. In this case, a size p of the license plate detected in the image or a size h of the number of the plate detected in the image may be represented by the pixel size.

Thus, a distance D between the vehicle and the camera may be calculated according to the following equation using the size h of the number of the plate in the image.

$D=f \times H/(s \times h)$

Therefore, assuming that the sizes of the number of the license plate detected in the image at time t1 and time t2 are denoted by h(t1) and h(t2), respectively, the moving distance of the vehicle, "L=D(t2)−D(t1)" is calculated between t1 and t2, and the vehicle speed may be calculated using the moving distance.

vehicle speed($v$)=$L/(t2-t1)=(D(t1)-D(t2))/(t2-t1)=f \times H/(s \times (h(t2)-h(t1)) \times (t2-t1))$ However, it is assumed that the license plate of the vehicle is photographed when the camera is in line with the driving method of the vehicle. When the camera photographs the license plate of the vehicle at time t1 and time t2 in an actual situation, an angle at which the camera photographs the vehicle is changed, so that correction may be performed for the angle difference to more precisely detect a speed.

To be more specific, in a general installation environment, the camera may be installed above the vehicle in a vehicle travel direction. In addition, the camera may be installed above a left side or a right side on a front of the vehicle in the vehicle travel direction. In this case, additional correction in the left or right direction is required according to the camera installation angle when calculating the moving distance in the vehicle travel direction at the first time and the second time. Here, the vehicle speed may be calculated by dividing "the actual moving distance of the vehicle calculated through the correction" by "time (t2−t1) spent on the movement".

Figure 2:
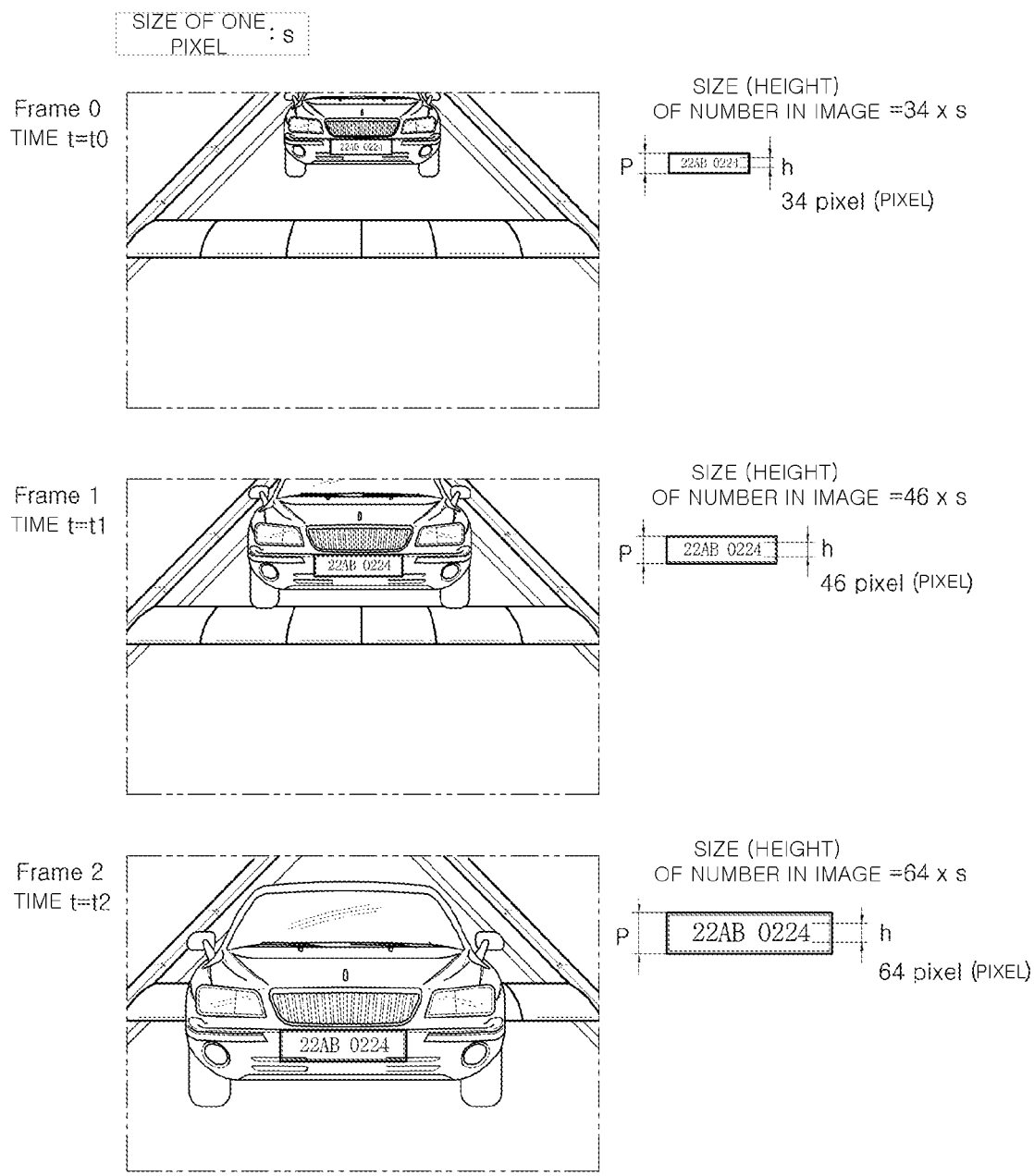
FIG. 2 is a diagram illustrating a change in size of a license plate or a number of the plate in an image as a vehicle is driven, according to the embodiment.

FIG. 2 is a diagram illustrating the change in size of the license plate (number) in the image as the function of time, according to the vehicle-speed detecting method of the embodiment. To be more specific, FIG. 2 illustrates an example of such a change.

As shown in FIG. 2, the change in size of the license plate (or the number of the plate including letters or numbers) in the image provided by the camera according to the embodiment is as follows.

When the size of one pixel (s) is defined as 5,
1) in the case of Frame 0 and time t=t0, size (height) of number of plate in image=34×5,
2) in the case of Frame 1 and time t=t1, size (height) of number of plate in image=46×5
3) in the case of Frame 2 and time t=t2, size (height) of number of plate in image=64×5.

Therefore, the distance between the vehicle and the camera may be calculated using the change in size of the license plate or the number of the plate in the license plate image of the vehicle at two different times when the vehicle moves.

Figure 5:
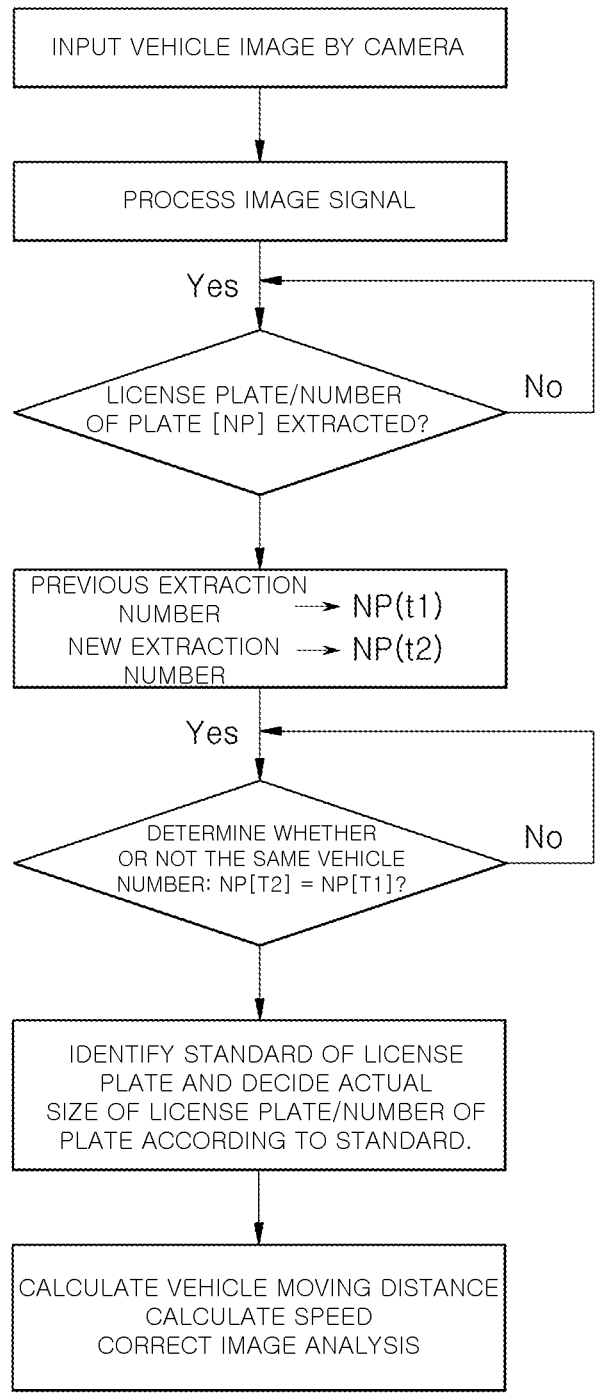
FIG. 5 is a flowchart showing a speed measuring method of a vehicle-speed measuring system, according to an embodiment.

FIG. 5 is a flowchart showing the speed measuring method of the vehicle-speed measuring system. The vehicle-speed detecting system including the camera, the controller (processor), and a memory may detect the vehicle speed through the following steps.

The vehicle-speed measuring system receives the vehicle image from the camera. Subsequently, the controller of the vehicle-speed measuring system performs a signal processing operation of the image photographed at the first time and the second time, and checks whether the vehicle photographed at the first time and the second time is the same vehicle. The following steps may be included:

a step of receiving a first vehicle image photographed by the camera at a first time t1;

a step of receiving a second vehicle image photographed by the camera at a second time t2;

a step of determining whether a vehicle of the first vehicle image and a vehicle of the second vehicle image are the same vehicle or not;

If it is determined that the images at the first time and the second time are the same vehicle image, the standard of the license plate of the vehicle is identified, and the actual size of the license plate and the actual size of the number described in the license plate is decided. The following steps may be included:

a step of identifying the standard of the license plate by analyzing the height, width, and interval of numbers in the license plate, or analyzing the width and height of the license plate, and the position of the anchoring bolt of the license plate, from either of the first vehicle image or the second vehicle image, when it is determined that the vehicle of the first vehicle image and the vehicle of the second vehicle image are the same vehicle, and then deciding the actual size H of the number of the plate from the identified license-plate standard;

a step of waiting to extract a number of a plate of a newly inputted vehicle image in the following order, when the first number of the plate is not equal to the second number of the plate;

In one embodiment, when it is determined whether or not the same vehicle in the photographed image, the license plate/the number of the plate is extracted, and it is determined whether the number of the plate (abbreviated to NP) photographed at the first time and the second time is the same number, namely, NP(t2)=NP(t1). Through such a process, the procedure of calculating the vehicle moving distance only for the same vehicle is started. In contrast, if the number of the plate in the image extracted at the first time is different from the number of the plate in the image extracted at the second time, the vehicle-speed measuring system determines that the number of another vehicle is newly extracted, the procedure of calculating the vehicle moving distance is not started, and was for the number extraction for a next image.

In a further embodiment, when the vehicle number is recognized at the first time and the second time, namely twice, and the vehicle number recognized at the first time is the same as the vehicle number recognized at the second time, the objects photographed at the first time and the second time are determined as being the same object. However, without being limited thereto, it is possible to determine whether the objects are the same object or not, by checking other features or positional relationship of the objects. For example, a step of determining whether the vehicle of the first vehicle image is equal to the vehicle of the second vehicle image may include a step of comparing the features including the shapes or colors of the vehicles, on the basis of the first vehicle image and the second vehicle image, to determine whether the first vehicle is the same as the second vehicle.

The number of the plate is only an example for determining whether or not the same object. Since it usually takes a long time to recognize the number, a processing time may be insufficient or the number may not be properly recognized. Therefore, when it is determined that the object at the first time is equal to the object at the second time by comparing the features or positional relationship of the objects, the speed may be first calculated. If the speed is equal to or more than a predetermined speed, a step of "recognizing the vehicle number" may be performed. In this case, if the vehicle speed v exceeds a predetermined speed limit, a step of extracting the number of the plate from either of the first vehicle image and the second vehicle image may be further included.

If the actual sizes of the license plate and the number described in the license plate are decided, the distance D between the vehicle and the camera may be calculated using the focal length f of the camera, the pixel size s of the camera, and the size h of the number of the plate or the size p of the license plate in the photographed vehicle image, and the vehicle speed may be calculated using the information. This calculation process may include the following steps:

a step of calculating the distance D between the vehicle and the camera at the first time and the second time, using the focal length f of the camera, the pixel size s of the camera, and the size h of the number of the plate (or the size p of the license plate) in the photographed vehicle image;

a step of calculating the vehicle speed v using a distance between the vehicle and the camera at the first time and the second time, and a time difference between the first time and the second time;

The vehicle-speed measuring system may calculate the distance between the vehicle and the camera at the first time and the second time using the following equation:

$$\text{distance}(D)\text{between vehicle and camera} = f \times H/(s \times h) \quad \text{[Equation 1]}$$

(where f is the focal length of the camera, H is the actual size of the number of the plate, s is the pixel size, and h is the size of the number of the plate detected in the image)

The vehicle-speed measuring system may calculate the vehicle speed at the first time and the second time using the following equation:

$$\text{vehicle speed}(v) = L/(t2-t1) = (D(t1)-D(t2))/(t2-t1) = f \times H/(s \times (h(t2)-h(t1)) \times (t2-t1)) \quad \text{[Equation 2]}$$

(where L is the vehicle moving distance between the first time and the second time, D(t1) is the distance between the camera and the vehicle at the first time, D(t2) is the distance between the camera and the vehicle at the second time, f is the focal length of the camera, H is the actual size of the number of the plate, s is the pixel size, h(t1) is the size of the number of the plate detected in the image at the first time, and h(t2) is the size of the number of the plate detected in the image at the second time)

In addition, the vehicle speed may be calculated by the following equation using the actual size of the vehicle license plate and the size of the vehicle license plate detected in the image:

$$\text{distance}(D)\text{between vehicle and camera} = f \times P/(s \times p) \quad \text{[Equation 5]}$$

(where f is the focal length of the camera, P is the actual size of the license plate, s is the pixel size, and p is the size of the license plate detected in the image)

$$\text{vehicle speed}(v) = L/(t2-t1) = (D(t1)-D(t2))/(t2-t1) = f \times P/(s \times (p(t2)-p(t1)) \times (t2-t1)) \quad \text{[Equation 6]}$$

(where L is the vehicle moving distance between the first time and the second time, D(t1) is the distance between the camera and the vehicle at the first time, D(t2) is the distance between the camera and the vehicle at the second time, f is the focal length of the camera, P is the actual size of the license plate, s is the pixel size, p(t1) is the size of the license plate detected in the image at the first time, and p(t2) is the size of the license plate detected in the image at the second time)

Figure 4:
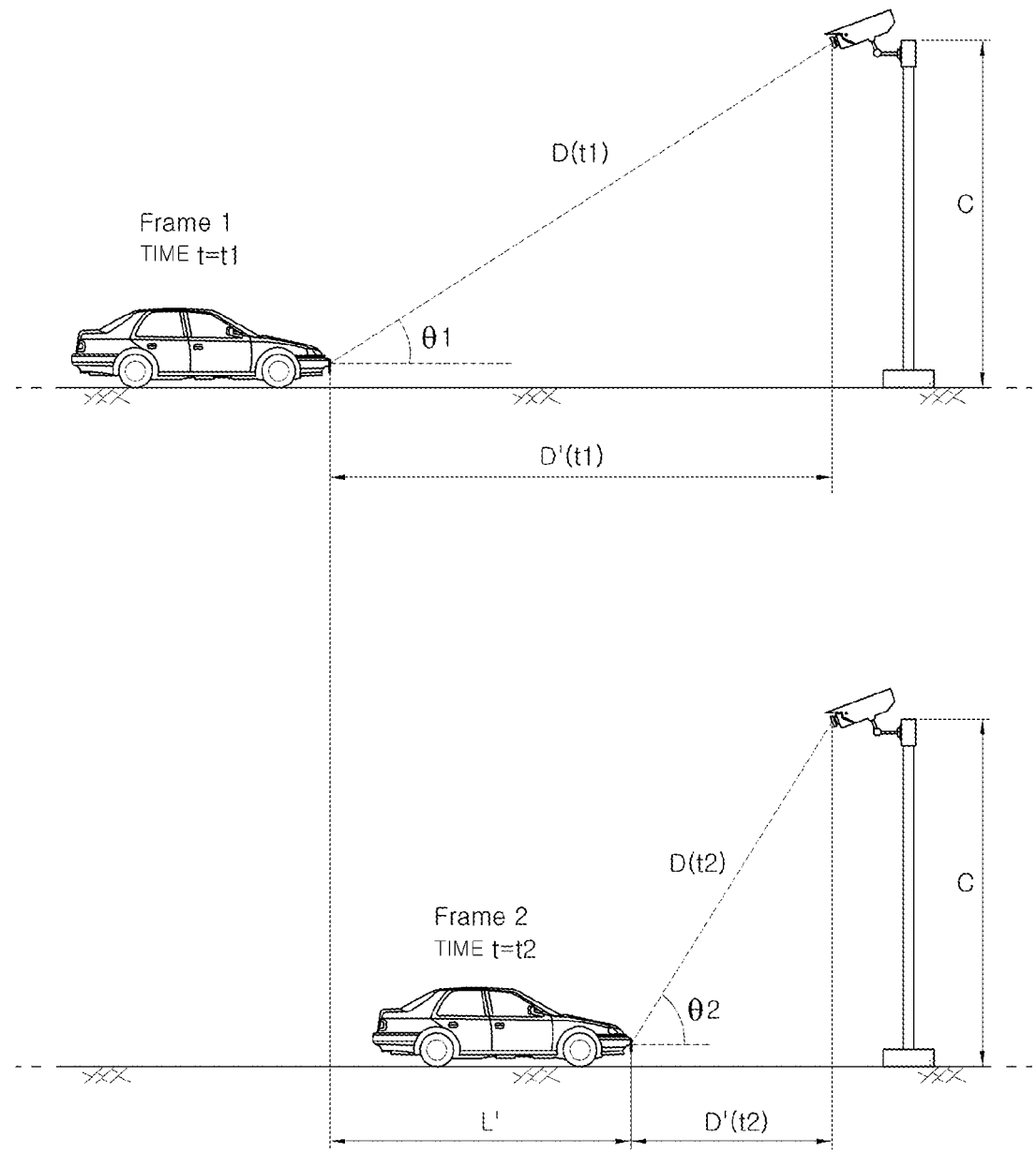
FIG. 4 is a diagram illustrating a method of detecting a vehicle speed that is corrected using a distance difference and an angle difference between the vehicle and the monitoring camera, according to the embodiment.

The above-described method of calculating the vehicle speed may be most precisely applied if the vehicle and the camera are aligned with each other when the camera photographs the driving vehicle at the first time and the second time. However, referring to FIG. 4, it is difficult for the camera to be placed on the same plane as the vehicle under actual road conditions, and the camera is installed at a predetermined height c from a ground surface. Thus, a certain angle difference θ may occur between a camera photographing direction and a vehicle travel direction, and a distortion effect may be caused when the vehicle speed is calculated. A correcting operation may be further applied to reduce the distortion caused by the height c at which the camera is installed and the angle difference θ at the photographing time so that the measurement approximates to the actual speed of the vehicle. Such a correcting operation may include the following steps:

The step of calculating the distance D between the vehicle and the camera at the first time and the second time may include a step of calculating a corrected distance D' between the camera and the vehicle according to the following [Equation 3].

$$D'(t1) = D(t1) \times \cos(\theta_1), \theta_1 = \sin^{-1}(c/D(t1))$$

$$D'(t2) = D(t2) \times \cos(\theta_2), \theta_2 = \sin^{-1}(c/D(t2)) \quad \text{[Equation 3]}$$

(where c is a height from the ground to the camera)

The corrected vehicle speed v' may be calculated by the following [Equation 4] using the corrected distance D' between the camera and the vehicle.

$$\text{corrected vehicle speed}(v') = (D'(t1) - D'(t2))/(t2-t1) \quad \text{[Equation 4]}$$

In another embodiment, a case where the camera installation angle and the vehicle travel direction are not in line with each other may be considered. In this case, the step of calculating the vehicle speed v may include a step of further correcting the vehicle moving distance between the first time and the second time in a left/right direction on the basis of the angle difference between the camera installation angle and the vehicle travel direction. Furthermore, the step of calculating the vehicle speed v may include a step of calculating a corrected vehicle speed v" by dividing the vehicle moving distance L' between the first time and the second time, which has been further corrected, by time (t2-t1) spent on the movement.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A method of detecting a vehicle speed using a vehicle-speed detecting system including a camera, a processor, and a memory, the method comprising:
   receiving a first vehicle image photographed by the camera at a first time (t1);
   receiving a second vehicle image photographed by the camera at a second time (t2);
   determining whether a vehicle of the first vehicle image and a vehicle of the second vehicle image are the same vehicle or not;
   identifying a standard of a license plate by analyzing a height, a width, and an interval of numbers in the license plate, or analyzing a width and a height of the license plate, and a position of an anchoring bolt of the license plate, from either of the first vehicle image or the second vehicle image, when it is determined that the vehicle of the first vehicle image and the vehicle of the second vehicle image are the same vehicle, and then deciding an actual size of the number of the plate (H) from the identified license-plate standard;
   calculating a distance (D) between the vehicle and the camera at the first time and the second time, using a focal length of the camera (f), a pixel size of the camera (s), and a size of the number of the plate (h) in the photographed vehicle image; and
   calculating the vehicle speed (v) using the distance between the vehicle and the camera at the first time and the second time, and a time difference between the first time and the second time.

2. The method of claim 1, further comprising:
   extracting the number of the plate from either of the first vehicle image and the second vehicle image, if the vehicle speed exceeds a predetermined speed limit.

3. The method of claim 1, wherein the determining whether the vehicle of the first vehicle image and the vehicle of the second vehicle image are the same vehicle or not comprises:

identifying an area occupied by the license plate from the first vehicle image, and extracting the position of the anchoring bolt of the license plate;
identifying an area occupied by the license plate from the second vehicle image, and extracting the position of the anchoring bolt of the license plate; and
comparing the position of the anchoring bolt of the license plate in the first vehicle image with the position of the anchoring bolt of the license plate in the second vehicle image to determine whether the first vehicle is equal to the second vehicle.

4. The method of claim 1, wherein the determining whether the vehicle of the first vehicle image and the vehicle of the second vehicle image are the same vehicle or not comprises:
identifying an area occupied by the license plate from the first vehicle image, and extracting a first number of the plate;
identifying an area occupied by the license plate from the second vehicle image, and extracting a second number of the plate; and
comparing the first number of the plate with the second number of the plate to determine whether the first number of the plate is equal to the second number of the plate.

5. The method of claim 4, further comprising:
waiting to extract a number of a plate of a newly inputted vehicle image in the following order, when the first number of the plate is not equal to the second number of the plate.

6. The method of claim 1, wherein the calculating the distance between the vehicle and the camera at the first time and the second time comprises:
calculating the distance between the vehicle and the camera according to the following [Equation 1]:

distance($D$)between vehicle and camera=$f \times H/(s \times h)$ [Equation 1]

(where f is a focal length of the camera, H is the actual size of the number of the plate, s is a pixel size, and h is the size of the number of the plate detected in the image).

7. The method of claim 6, wherein the calculating the vehicle speed comprises:
calculating the vehicle speed according to the following [Equation 2]:

vehicle speed($v$)=$L/(t2-t1)$=$(D(t1)-D(t2))/(t2-t1)$=$f \times H/(s \times (h(t2)-h(t1)) \times (t2-t1))$ [Equation 2]

(where L is a vehicle moving distance between the first time and the second time, D(t1) is the distance between the camera and the vehicle at the first time, D(t2) is the distance between the camera and the vehicle at the second time, f is the focal length of the camera, H is the actual size of the number of the plate, s is the pixel size, h(t1) is the size of the number of the plate detected in the image at the first time, and h(t2) is the size of the number of the plate detected in the image at the second time).

8. The method of claim 7, wherein the calculating the distance between the vehicle and the camera at the first time and the second time further comprises:
calculating a corrected distance between the camera and the vehicle according to the following [Equation 3]:

$D'(t1)=D(t1) \times \cos(\theta 1), \theta 1 = \sin^{-1}(c/D(t1))$ $D'(t2)=D(t2) \times \cos(\theta 2), \theta 2 = \sin^{-1}(c/D(t2))$ [Equation 3]

(where c is a height from a ground to the camera).

9. The method of claim 8, wherein the calculating the vehicle speed further comprises:
calculating a corrected vehicle speed according to the following [Equation 4] using the corrected distance between the camera and the vehicle:

corrected vehicle speed($v'$)=$(D'(t1)-D'(t2))/(t2-t1)$. [Equation 4]

10. The method of claim 7, wherein the calculating the vehicle speed further comprises:
further correcting the vehicle moving distance between the first time and the second time in a left/right direction on the basis of an angle difference between a camera installation angle and a vehicle travel direction, when the camera installation angle and the vehicle travel direction are not in line with each other; and
calculating a corrected vehicle speed ($v''$) by dividing the corrected vehicle moving distance (L') between the first time and the second time by a time spent on movement (t2−t1).

11. The method of claim 1, wherein the determining whether the vehicle of the first vehicle image and the vehicle of the second vehicle image are the same vehicle or not comprises:
comparing characteristics such as a vehicle shape or color of the first vehicle image with those of the second vehicle image to determine whether the first vehicle is equal to the second vehicle.

12. A method of detecting a vehicle speed using a vehicle-speed detecting system including a camera, a processor, and a memory, the method comprising:
receiving a first vehicle image photographed by the camera at a first time (t1);
receiving a second vehicle image photographed by the camera at a second time (t2);
determining whether a vehicle of the first vehicle image and a vehicle of the second vehicle image are the same vehicle or not;
identifying a standard of a license plate by analyzing a height, a width, and an interval of numbers in the license plate, or analyzing a width and a height of the license plate, and a position of an anchoring bolt of the license plate, from either of the first vehicle image or the second vehicle image, when it is determined that the vehicle of the first vehicle image and the vehicle of the second vehicle image are the same vehicle, and then deciding an actual size of the license plate (P) from the identified license-plate standard;
calculating a distance between the vehicle and the camera at the first time and the second time, using a focal length of the camera (f), a pixel size of the camera (s), and a size of the license plate (p) in the photographed vehicle image; and
calculating the vehicle speed (v) using the distance between the vehicle and the camera at the first time and the second time, and a time difference between the first time and the second time.

13. The method of claim 12, further comprising:
extracting the number of the plate from either of the first vehicle image and the second vehicle image, if the vehicle speed exceeds a predetermined speed limit.

14. The method of claim 12, wherein the determining whether the vehicle of the first vehicle image and the vehicle of the second vehicle image are the same vehicle or not comprises:
identifying an area occupied by the license plate from the first vehicle image, and extracting the position of the anchoring bolt of the license plate;

identifying an area occupied by the license plate from the second vehicle image, and extracting the position of the anchoring bolt of the license plate; and comparing the position of the anchoring bolt of the license plate in the first vehicle image with the position of the anchoring bolt of the license plate in the second vehicle image to determine whether the first vehicle is equal to the second vehicle.

15. The method of claim 12, wherein the determining whether the vehicle of the first vehicle image and the vehicle of the second vehicle image are the same vehicle or not comprises:

identifying an area occupied by the license plate from the first vehicle image, and extracting a first number of the plate;

identifying an area occupied by the license plate from the second vehicle image, and extracting a second number of the plate; and comparing the first number of the plate with the second number of the plate to determine whether the first number of the plate is equal to the second number of the plate.

16. The method of claim 15, further comprising:

waiting to extract a number of a plate of a newly inputted vehicle image in the following order, when the first number of the plate is not equal to the second number of the plate.

17. The method of claim 12, wherein the calculating the distance between the vehicle and the camera at the first time and the second time comprises:

calculating the distance between the vehicle and the camera according to the following [Equation 5]:

$$\text{distance}(D) \text{between vehicle and camera} = f \times P/(s \times p) \quad \text{[Equation 5]}$$

(where f is the focal length of the camera, P is the actual size of the license plate, s is the pixel size, and p is the size of the license plate detected in the image).

18. The method of claim 17, wherein the calculating the vehicle speed comprises:

calculating the vehicle speed according to the following [Equation 6]:

$$\text{vehicle speed}(v) = L/(t2-t1) = (D(t1)-D(t2))/(t2-t1) = f \times P/(s \times (p(t2)-p(t1)) \times (t2-t1)) \quad \text{[Equation 6]}$$

(where L is a vehicle moving distance between the first time and the second time, D(t1) is a distance between the camera and the vehicle at the first time, D(t2) is a distance between the camera and the vehicle at the second time, f is the focal length of the camera, P is the actual size of the license plate, s is the pixel size, p(t1) is a size of the license plate detected in the image at the first time, and p(t2) is a size of the license plate detected in the image at the second time).

19. The method of claim 18, wherein the calculating the distance between the vehicle and the camera at the first time and the second time further comprises:

calculating a corrected distance between the camera and the vehicle according to the following [Equation 7]:

$$D'(t1) = D(t1) \times \cos(\theta_1), \theta_1 = \sin^{-1}(c/D(t1))$$

$$D'(t2) = D(t2) \times \cos(\theta_2), \theta_2 = \sin^{-1}(c/D(t2)) \quad \text{[Equation 7]}$$

(where c is a height from a ground to the camera).

20. The method of claim 19, wherein the calculating the vehicle speed further comprises:

calculating a corrected vehicle speed according to the following [Equation 8] using the corrected distance between the camera and the vehicle:

$$\text{corrected vehicle speed}(v') = (D'(t1)-D'(t2))/(t2-t1). \quad \text{[Equation 8]}$$

21. The method of claim 18, wherein the calculating the vehicle speed further comprises:

further correcting the vehicle moving distance between the first time and the second time in a left/right direction on the basis of an angle difference between a camera installation angle and a vehicle travel direction, when the camera installation angle and the vehicle travel direction are not in line with each other; and calculating a corrected vehicle speed (v") by dividing the corrected vehicle moving distance (L') between the first time and the second time by a time spent on movement (t2−t1).

22. The method of claim 12, wherein the determining whether the vehicle of the first vehicle image and the vehicle of the second vehicle image are the same vehicle or not comprises:

comparing characteristics such as a vehicle shape or color of the first vehicle image with those of the second vehicle image to determine whether the first vehicle is equal to the second vehicle.

23. The method of claim 1, wherein the method includes extracting the number of the plate from either of the first vehicle image and the second vehicle image, if the vehicle speed exceeds a predetermined speed limit;

wherein the calculating the distance between the vehicle and the camera at the first time and the second time comprises calculating the distance between the vehicle and the camera according to the following [Equation 1]:

$$D = f \times H/(s \times h) \quad \text{[Equation 1]}$$

where D is the distance between the vehicle and the camera, f is a focal length of the camera, H is the actual size of the number of the plate, s is a pixel size, and h is the size of the number of the plate detected in the image;

wherein the calculating the vehicle speed comprises calculating the vehicle speed according to the following [Equation 2]:

$$(v) = L/(t2-t1) = (D(t1)-D(t2))/(t2-t1) = f \times H/(s \times (h(t2)-h(t1)) \times (t2-t1)) \quad \text{[Equation 2]}$$

where v is the vehicle speed, L is a vehicle moving distance between the first time and the second time, D(t1) is the distance between the camera and the vehicle at the first time, D(t2) is the distance between the camera and the vehicle at the second time, f is the focal length of the camera, H is the actual size of the number of the plate, s is the pixel size, h(t1) is the size of the number of the plate detected in the image at the first time, and h(t2) is the size of the number of the plate detected in the image at the second time;

wherein the calculating the distance between the vehicle and the camera at the first time and the second time, further comprises calculating a corrected distance, D'(t), between the camera and the vehicle according to the following [Equation 3]:

$$D'(t1) = D(t1) \times \cos(\theta 1), \theta 1 = \sin^{-1}(c/D(t1))$$

$$D'(t2) = D(t2) \times \cos(\theta 2), \theta 2 = \sin^{-1}(c/D(t2)) \quad \text{[Equation 3]}$$

where c is a height from a ground to the camera;

wherein the calculating the vehicle speed further comprises calculating a corrected vehicle speed, v', according to the following [Equation 4] using the corrected distance between the camera and the vehicle:

$$(v') = (D'(t1) - D'(t2))/(t2-t1) \qquad [\text{Equation 4}];$$

wherein the calculating the vehicle speed further comprises further correcting the vehicle moving distance between the first time and the second time in a left/right direction on the basis of an angle difference between a camera installation angle and a vehicle travel direction, when the camera installation angle and the vehicle travel direction are not in line with each other; and calculating a corrected vehicle speed (v") by dividing the corrected vehicle moving distance (L') between the first time and the second time by a time spent on movement (t2−t1).

* * * * *